(12) United States Patent
Vaghela et al.

(10) Patent No.: US 7,727,573 B2
(45) Date of Patent: *Jun. 1, 2010

(54) AERATED FROZEN PRODUCTS

(75) Inventors: Madansinh Vaghela, Marysville, OH (US); Tawfik Yousef Sharkasi, Chicago, IL (US); Björn F. Groh, Munich (DE); Myriam Schlegel, F-Fouquenies (FR); Josélio Batista Vieira, L'Isle-Adam (FR)

(73) Assignee: Nestec S.A., Vevey (CH)

( * ) Notice: Subject to any disclaimer, the term of this patent is extended or adjusted under 35 U.S.C. 154(b) by 699 days.

This patent is subject to a terminal disclaimer.

(21) Appl. No.: 11/029,814

(22) Filed: Jan. 4, 2005

(65) Prior Publication Data

US 2005/0123666 A1 Jun. 9, 2005

Related U.S. Application Data

(60) Continuation-in-part of application No. 10/388,279, filed on Mar. 13, 2003, now Pat. No. 6,890,577, which is a division of application No. 09/590,953, filed on Jun. 9, 2000, now Pat. No. 6,596,333.

(60) Provisional application No. 60/144,838, filed on Jul. 21, 1999.

(30) Foreign Application Priority Data

Apr. 8, 2004 (EP) ................................. 04008549
May 21, 2004 (EP) ................................. 04012146
May 25, 2004 (EP) ................................. 04015026

(51) Int. Cl.
*A23G 9/04* (2006.01)

(52) U.S. Cl. .................... 426/565; 426/100; 426/101
(58) Field of Classification Search .................... None
See application file for complete search history.

(56) References Cited

U.S. PATENT DOCUMENTS 2,048,364 A 7/1936 Williams ..................... 426/101

(Continued)

FOREIGN PATENT DOCUMENTS

EP 0 157594 A2 10/1985

(Continued)

OTHER PUBLICATIONS

Database FSTA 'Online! International Food Information Service (IFIS), Frankfurt-Main, DE; 1977, Wielinga W C: "Some aspects of stabilization of edible ices." XP002331392.

(Continued)

*Primary Examiner*—Lien Tran
(74) *Attorney, Agent, or Firm*—Winston & Strawn LLP

(57) ABSTRACT

An aerated frozen confection having reduced ice crystal growth after heat shock, and being prepared from a mixture of ingredients suitable for forming the confection and at least one emulsifier for reducing ice crystal growth after heat shock. Advantageously, the emulsifier facilitates formation and stabilization of fat alpha crystals, the confection having an overrun of about 20% to about 250%, uniformly distributed small air cells having an average size of less than about 50 microns, ice crystals having a size of 30 microns or less after heat shock, and a smooth texture.

29 Claims, 4 Drawing Sheets

U.S. PATENT DOCUMENTS

| | | | |
|---|---|---|---|
| 2,587,369 A | 2/1952 | Nash | 426/566 |
| 2,604,406 A | 7/1952 | Blihovde | 426/567 |
| 3,355,300 A | 11/1967 | Avedikian et al. | 426/546 |
| 3,582,357 A | 6/1971 | Katz | 426/564 |
| 3,673,106 A | 6/1972 | Jonas et al. | 252/356 |
| 3,677,443 A | 7/1972 | Smadar et al. | 222/94 |
| 3,702,768 A | 11/1972 | Finucane et al. | 99/136 |
| 3,821,442 A | 6/1974 | MacDonald et al. | 426/565 |
| 3,924,018 A | 12/1975 | Sims et al. | 426/565 |
| 3,928,648 A | 12/1975 | Stahl et al. | 426/564 |
| 3,968,266 A | 7/1976 | Baugher | 426/566 |
| 3,991,224 A | 11/1976 | Sturms et al. | 426/656 |
| 3,996,389 A | 12/1976 | Osborne | 426/565 |
| 4,012,533 A | 3/1977 | Jonas | 426/565 |
| 4,244,977 A * | 1/1981 | Kahn et al. | 426/330.2 |
| 4,431,682 A | 2/1984 | Smith et al. | 426/565 |
| 4,450,182 A | 5/1984 | Stahl et al. | 426/565 |
| 4,451,492 A | 5/1984 | Dell et al. | 426/564 |
| 4,452,824 A | 6/1984 | Cole et al. | 426/565 |
| 4,500,553 A | 2/1985 | Liggett et al. | 426/565 |
| 4,505,943 A | 3/1985 | Dell et al. | 426/565 |
| 4,542,035 A * | 9/1985 | Huang et al. | 426/565 |
| 4,724,153 A | 2/1988 | Dulin et al. | 426/565 |
| 4,795,650 A | 1/1989 | Groobert | 426/305 |
| 4,828,866 A | 5/1989 | Wade et al. | 426/599 |
| 4,988,529 A * | 1/1991 | Nakaya et al. | 426/569 |
| 5,077,076 A | 12/1991 | Gonsalves et al. | 426/565 |
| 5,084,295 A | 1/1992 | Whelan et al. | 426/565 |
| 5,112,626 A | 5/1992 | Huang et al. | 426/43 |
| 5,171,602 A | 12/1992 | Martin et al. | 426/567 |
| 5,175,013 A | 12/1992 | Huang et al. | 426/565 |
| 5,194,281 A | 3/1993 | Johnston et al. | 426/531 |
| 5,292,030 A | 3/1994 | Kateman et al. | 222/1 |
| 5,343,710 A | 9/1994 | Cathenaut et al. | 62/71 |
| 5,384,145 A | 1/1995 | Gonsalves et al. | 426/565 |
| 5,403,611 A | 4/1995 | Tomita et al. | 426/565 |
| 5,472,726 A | 12/1995 | Bee et al. | 426/565 |
| 5,486,372 A | 1/1996 | Martin et al. | 426/565 |
| 5,486,373 A | 1/1996 | Holt et al. | 426/565 |
| 5,758,571 A | 6/1998 | Kateman et al. | 99/455 |
| 5,879,731 A | 3/1999 | Beckett et al. | 426/101 |
| 6,083,546 A | 7/2000 | Carrick et al. | 426/565 |
| 6,497,913 B1 * | 12/2002 | Gray et al. | 426/565 |
| 2003/0134024 A1 | 7/2003 | Malone et al. | 426/565 |
| 2003/0134025 A1 | 7/2003 | Vaghela et al. | 426/565 |

FOREIGN PATENT DOCUMENTS

| | | |
|---|---|---|
| EP | 0 191 487 A2 | 8/1986 |
| EP | 0 455 288 A1 | 11/1991 |
| EP | 1 040 760 A1 | 10/2000 |
| GB | 822614 | 10/1959 |
| GB | 1446144 | 8/1976 |
| GB | 1 484 167 | 9/1977 |
| GB | 1484167 | 9/1977 |
| GB | 1495750 | 12/1977 |
| JP | 62 106840 | 10/1987 |
| WO | WO 93/21777 A1 | 11/1993 |
| WO | WO 94/21138 A1 | 9/1994 |
| WO | WO 98/09536 A1 | 3/1998 |
| WO | WO 98/18350 A1 | 5/1998 |
| WO | WO 00/01246 A1 | 1/2000 |
| WO | WO 03/015530 | 2/2003 |

OTHER PUBLICATIONS

Database FSTA Online! International Food Information Service (IFIS), Frankfurt-Main, DE; 1979, Hansen A P: "Using whey in ice cream." XP002291514.

Opdahl L J et al: "Composition and Consumer Acceptance of Frozen Yoguarts Utilizing Whey Protein Concentrates1" Journal of Dairy Science, American Dairy Science Association. Champaign, Illinois, US, vol. 74, No. 12, Dec. 1, 1991, pp. 4151-4163.

Database WPI Section Ch, Week 199513 Derwent Publications Ltd., London, GB; AN 1990-035088 XP002301568-& FI 93 791 B (Semper AB) Feb. 28, 1995.

Database FSTA Online! International Food Information Service (IFIS), Frankfurt-Main, DE; 1997, Kebary K M K et al: "Quality of ice cream as influenced by substituting non-fat dry milk with whey-bean proteins coprecipitates." XP002291513.

Marshall, R.T. and Arbuckle, W.S., Ice Cream ($5^{th}$ Ed.), Chapman and Hall, 1996, 76-77, 208-209 and 250-251.

Sjoblom, J. (Ed.), Emulsions—A Fundamental and Practical Approach, Kluwer Academic Publishers, Netherlands, 1992, 61-72.

Clark, C., The Science of Ice Cream, The Royal Society of Chemistry, Cambridge, 2004, 7677.

* cited by examiner

Microscopic picture of ice crystals in fresh samples

1. Standard

2. Test

Microscopic picture of ice crystals in heat shocked samples

1. Standard

2. Test

AERATED FROZEN PRODUCTS

CROSS-REFERENCE TO RELATED APPLICATIONS

This application is a continuation-in-part of application Ser. No. 10/388,279, filed Mar. 13, 2003 now U.S. Pat. No. 6,890,577, which is a division of application Ser. No. 09/590,953, filed Jun. 9, 2000, now U.S. Pat. No. 6,596,333, which claims the benefit of Provisional Application No. 60/144,838, filed Jul. 21, 1999, now abandoned, the contents of each of which are expressly incorporated herein by reference thereto.

FIELD OF THE INVENTION

The present invention is directed to aerated frozen confection having resistance to heat shock. The aerated frozen confection includes but not limited to, ice cream, water ice, frozen yogurt, and the like. The invention also relates to a method for regulating ice crystal growth in an aerated frozen confection.

BACKGROUND OF THE INVENTION

Frozen confections are particularly appreciated for their creamy and smooth characteristics. In order preserve the optimum organoleptic characteristics of smoothness, however, the frozen confections need to be stored and handled with care as even small temperature variations can be observed during storage, distribution, or handling. This is particularly the case when a consumer purchases a frozen confectionery and does not consume it quickly. When there is a gap between the time the frozen product is taken from the deep frozen section and placed in a domestic freezer, a partial thawing of the frozen product occurs before it is refrozen. Such cycles of temperature variation, which is known as "heat shock" cause the formation and growth of ice crystals in the product. The formation and growth of ice crystals in the product cause an undesirable crystallized texture in the frozen confectionery. The crystallized texture and the icy mouth feel, as well as the impaired appearance, reduces the overall quality of the frozen confection as perceived by the consumer.

Various gums and emulsifiers have been used as additives to the frozen confection with the aim of improving the stability, smoothness, and the heat shock resistance of aerated frozen confections. For example, U.S. Pat. No. 4,500,553 to Liggett discloses that a gum stabilizer in combination with a monosaccharide and disaccharide sweeteners contributes to limiting the growth of ice crystals upon freezing and storage of frozen confection. In addition, U.S. Pat. No. 4,542,035 to Huang discloses that adding to the product an edible multivalent cationic electrolyte such as calcium, magnesium, aluminum, iron, manganese and the like improve stability of the frozen product.

Traditionally, molded aerated frozen bars, ice cream, or water ice are manufactured by partially freezing an ice cream mix, ice milk mix, frozen yogurt mix, water ice mix, or fruit juice mix in conventional batch or continuous freezers followed by pumping and filling the mix into molds of different shapes and sizes. During the last decade, a new generation of freezers has been developed which are equipped with pre-whippers that enable the mix to be pre-aerated before being partially frozen in the freezer. The molded products are usually quiescently frozen using a cold brine system at $-30°$ C. to $-40°$ C. If desired, after demolding, the molded products may be coated with chocolate or compound coating. Finally, the products are usually packaged and stored at about $-30°$ C. until transport and distribution.

This traditional process for manufacturing molded aerated frozen bars, ice milk, yogurt, ice cream, or water ice is not without limitations. One such limitation, for example, is the formation of an icy texture due to the partial freezing of the mix in the freezer, followed by quiescent freezing in the molds. This also is known to lead to loss of air, and the formation of large air cells in the product having a size range of about 110-185 microns. Arbuckle, W. S. Ice Cream, Fourth Edition, 1986, Van Nostrand Reinhold, New York, p 234.

In addition, shrinkage of the product is often a problem, and when eating the product, a very cold feeling in the mouth is experienced. Furthermore, it is difficult to achieve more than 20% overrun in water ice, a typical overrun is from 0% to 20% and usually is about 5%. Also, it is difficult to achieve more than 80% overrun and quite difficult to achieve an overrun of 120% or higher in finished ice cream products using conventional manufacturing.

Non-molded products have similar problems. Air cells and ice crystals start growing immediately after production of non-molded products. Significant air cell and ice crystal growth occurs during transportation, storage at the grocery store or during transportation and storage of the products by the consumer. There is a need for inhibiting or delaying air cell or ice crystal growth after production or during hardening, transportation, or distribution.

Currently, there is no method that satisfactorily regulates the formation and growth of ice crystals in an aerated frozen confection and no process that can produce very stable finely aerated frozen ice cream, ice milk, yogurt, or water ice having an average air cell size of less than 50 microns and an average ice crystal size of 25 microns or that are heat shock resistant for a period of time after production. Thus, there is a need for finely aerated ice cream, ice milk, yogurt or water ice that maintain a smooth texture, do not suffer from growth of ice crystals, shrinkage, do not give a very cold feeling in the mouth, have an uniform appearance without large air pockets on the surface and have a significantly higher heat shock resistance. The present invention provides products and processes which overcome these disadvantages.

SUMMARY OF THE INVENTION

The invention relates to a method for regulating the formation and growth of ice crystals in a frozen aerated confection. The frozen aerated confection may be a frozen ice cream, ice milk, yogurt, or water ice product but is not limited to such. It has been surprisingly found that adding a polyol ester of a fatty acid to a mixture of ingredients suitable for frozen aerated confections produces an aerated frozen product that exhibits smaller sized ice crystals after being exposed to temperature variations. Advantageously, the present method regulates ice crystal growth such that the ice crystals have a mean diameter of 30 microns or less after heat shock. Moreover, the taste of the frozen product has a smoother and more favorable texture as evaluated by tasting panelists.

The polyol ester of a fatty acid is added to the mixture in an amount of between about 0.1% to about 1% of the mixture. Preferably, the polyol ester of a fatty acid is present in an amount of at least 0.2 to 0.5%. The polyol ester of a fatty acid preferably is propylene glycol monostearate ("PGMS"), propylene glycol palmitate or a mixture thereof. The polyol ester of fatty acid may be used alone or in combination with an additional emulsifier. Examples of additional emulsifiers include but are not limited to unsaturated monoglyceride, saturated mono-diglyceride, or any other emulsifier known in the art including sorbitan tristearate.

The mixture of ingredients for forming an aerated frozen confection include a fat, sweetener, and non-fat milk solids. The non-fat milk solids may be from skim milk, milk, or whey products. Additionally, coloring and flavoring may be added to the mixture of ingredients.

In accordance with the method, the polyol ester of a fatty acid and the mixture of ingredients are combined with shear mixing to form a homogeneous mass. The homogeneous mass is pasteurized. The pasteurized mass is then frozen while air is introduced to achieve a desired degree of overrun in the frozen mass. The aerated frozen ice cream or water ice have an overrun of about 20% to about 250% and of about 5% to about 100%, respectively, and contain air cells having an average size of less than about 50 microns which cells are uniformly distributed throughout the ice cream or water ice and which are substantially invisible to the naked eye. Preferably, the aerated frozen products have air cells with an average size of about 15 microns to about 40 microns and an ice crystal size of less than about 30 microns. The process produces an aerated molded frozen product having a smooth texture similar to an extruded ice cream and heat shock resistant. The aerated frozen confection of the invention may be soft and scoopable so that a consumer can easily scoop the frozen confection from a container upon taking the confection out of the home freezer. In this regard, a freezing point depressant is added to the mixture of ingredients so that the product is soft and scoopable at a temperature of about −18° C. The freezing point depressants may be sucrose, dextrose, fructose, glucose syrup, polydextrose, inulin, sorbitol, mannitol, lactilol, oxylitol, malitol, glycerol, ethanol or a mixture thereof.

The aerated frozen confection may also be a reduced calorie or "light" frozen product. In this regard, the fat selected for the mixture is rich in polyunsaturated fatty acids.

If desired, the aerated frozen products can contain inclusions or have a coating that optionally contains inclusions, which are added before or during freezing. Further, the aerated frozen products may be shell and core products with ice cream as a core and water ice, fruit juice, fruit ice, real fruit, or a mixture thereof as a shell or coating, the latter having an overrun of up to about 20%.

The present invention also relates to a process for the production of aerated frozen products comprising the steps of preparing a mixture of ingredients suitable for preparing a aerated frozen product, adding an emulsifier or mixture thereof in a suitable amount to obtain a mix, aerating the mix to obtain an aerated mix having an overrun of about 20% to about 250% for ice cream products and an overrun of about 5% to about 100% for water ice products, and freezing the aerated mix to form the aerated frozen product. In this process, the mix can be an ice cream mix, a water ice mix, a fruit juice mix, a frozen yogurt mix, a sherbet mix, or a mixture thereof.

The emulsifier may also be a blend of emulsifiers comprising at least one emulsifier capable of facilitating the formation and stabilization of fat α-crystals and present in an amount of about 0.01% to about 3% by weight of the mix. As mentioned above, the emulsifier blend may include at least one of propylene glycol monostearate, sorbitan tristearate, lactylated monoglycerides, acetylated monoglycerides, or unsaturated monoglycerides, preferably the emulsifier mixture comprises propylene glycol monostearate, sorbitan tristearate, and unsaturated monoglycerides.

The mix of ingredients is prepared using conventional methods such as by combining the ingredients with shear mixing to disperse and solubilize them into a homogeneous mass, followed by homogenizing the mass and pasteurizing the homogenized mass. The homogenizing step can be conducted in a two stage homogenizer at a pressure of about 70 bar to about 250 bar in the first stage and of about 0 bar to about 50 bar in the second stage. Also, the mix can be aged after pasteurization by storing at a temperature of about 0° C. to about 6° C. for about 1 hour to about 24 hours. If desired, the mix can be colored and flavored before being aerated at a temperature of about 0° C. to about 12° C. to obtain the desired overrun. Preferably, the aerated mix is directly fed to a container or mold and frozen to produce the aerated frozen product, with the freezing being allowed to take place quiescently at a temperature of about −25° C. to about −45° C.

The aerating step can be conducted by allowing the mix pass through a conventional freezer at a draw temperature of about −4° C. to about −7° C. In contrast, for molded products, the aerating step can be a whipping step conducted by using a conventional mixer at a speed of about 150 rpm to about 1000 rpm and at a flow rate of about 10 L/h to about 1000 L/h.

It is to be understood that both the foregoing general description and the following detailed description are exemplary and are intended to provide further explanation of the invention claimed and are intended to limit the invention.

DETAILED DESCRIPTION OF THE INVENTION

Figure 1:
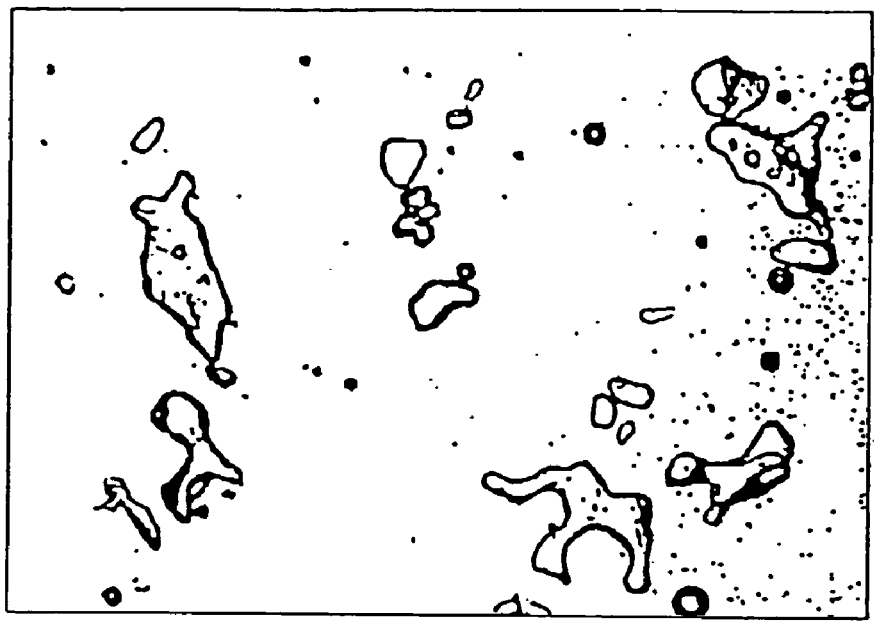
FIG. 1 illustrates ice crystals in a conventionally molded aerated ice cream bar after heat shock.

It has surprisingly been found that an aerated frozen confection exhibiting reduced crystal growth after having been subjected to heat shock can be produced by adding a polyol ester of a fatty acid to a mixture of ingredients for forming an aerated frozen confection. The polyol ester of a fatty acid is added to the mixture of ingredients in an amount that is sufficient to regulate crystal growth after heat shock. The term "heat shock," as used herein, unless otherwise indicated, means the temperature fluctuations related to the storage and transportation of frozen ice cream, ice milk, yogurt, or water ice product. Heat shock can be simulated by treating a frozen ice cream product to temperature cycling of about −8° C. to about −20° C. every 12 hours, with 30 min temperature ramp time for a period of about two weeks, or by any other testing method commonly used in the industry.

The polyol ester of a fatty acid preferably is present in an amount of at least 0.2% of the frozen confection by weight, and is more preferably present in an amount of at least 0.25%. The polyol ester of a fatty acid is preferably a propylene glycol monoester of a fatty acid such as "PGMS" or propylene glycol palmitate or a combination thereof.

A typical aerated frozen product mix may contain fat in an amount of about 0.5% to about 18% by weight based on the total weight of the mix, non-fat milk solids in an amount of about 6% to about 15% by weight based on the total weight of the mix, sugar in an amount of about 10% to about 15% by weight based on the total weight of the mix, a sweetener in an amount of about 3% to about 8% by weight based on the total weight of the mix, an emulsifier blend in an amount of about 0.01% to about 3% by weight based on the total weight of the mix, and a stabilizer in an amount of about 0.1% to about 1% by weight based on the total weight of the mix.

The fat used may be a dairy fat, a non-dairy fat, or a mixture of both. When the fat is a dairy fat, it may be for instance, any milk fat source such as butter oil, butter, real cream, or a mixture thereof. When the fat is a non-dairy fat it may be, for instance, an edible oil or fat, preferably a vegetable oil such as coconut oil, palm kernel oil, palm oil, cotton oil, peanut oil, olive oil, soy bean oil, rapeseed, olive, hydrogenated coconut oil, hydrogenated soybean oil, palm olein etc., or mixtures thereof.

The non-fat milk solids may be powdered or concentrated defatted sweet whey for example or powdered or concentrated skim milk. The non-fat milk solids may also be derived from a commercial mixture of milk powder and whey proteins, whose functionality has been modified by specific denaturation treatments.

The sugar used may be sucrose, glucose, fructose, lactose, dextrose, invert sugar either crystalline or liquid syrup form, or mixtures thereof.

The sweetener may be a corn sweetener in either a crystalline form of refined corn sugar (dextrose and fructose), a dried corn syrup (corn syrup solids), a liquid corn syrup, a maltodextrin, glucose, or a mixture thereof.

The mixture may further contain inclusions such as but not limited to fruit or fruit pieces, for example, nuts, hazelnuts, whole or in pieces.

The polyol ester of a fatty acid may be used alone or in combination with an additional emulsifier. Preferably, the emulsifier facilitates formation and stabilization of fat α-crystals. For example, the emulsifiers include but are not limited to saturated mono-diglyceride, sorbitan tristearate ("STS"), lactylated monoglycerides, acetylated monoglycerides, unsaturated monoglycerides, including monoglycerides with oleic acid, linoleic acid, linolenic acid, or other commonly available higher unsaturated fatty acids. In one aspect of the invention, the emulsifier is a blend comprising PGMS, STS, and unsaturated monoglycerides. Preferably, the polyol ester of a fatty acid is used in combination with an unsaturated monoglyceride.

The emulsifier blend should be present in an amount of about 0.01% to about 5%, preferably of about 0.04% to about 1%, and more preferably of about 0.2% to about 0.5% by weight of the mix. In one embodiment, the emulsifier blend is present in a combination of PGMS, STS, and unsaturated monoglycerides. The blend of PGMS, STS, and unsaturated monoglycerides is present in an amount of about 0.1% to about 1%, of about 0.01% to about 0.2%, and of about 0.01% to about 0.2% by weight of the mix, respectively. Preferably, PGMS, STS, and unsaturated monoglycerides should be present in an amount of about 0.2% to about 0.5%, of about 0.02% to about 0.05%, and of about 0.02% to about 0.1% by weight of the mix, respectively. The emulsifier blend should be present in a combination of PGMS, STS, and unsaturated monoglycerides and in amounts of about 0.25% to about 0.35%, of about 0.02% to about 0.03%, and of about 0.02% to about 0.05% by weight of the mix, respectively.

The stabilizer may be, for instance, a hydrocolloid such as agar, gelatin, gum acacia, guar gum, locust bean gum, gum tragacanth, carrageenan and its salts, carboxymethyl cellulose, sodium alginate or propylene glycol alginate, or any mixture of hydrocolloids, carob flour, guar flour, alginates xanthan, starches. Preferably the stabilizer is present in an amount of about 0.1% to about 0.5% of the mixture.

In another aspect of the invention is provided a soft aerated frozen confection. The term "soft" as used herein means that the aerated frozen confection is scoopable at a temperature of −18° C. or less. The term "scoopable" is used in its ordinary meaning in that the ice cream is sufficiently soft at freezer temperatures so that it can be scooped from a container by hand or extracted from a cartridge at that temperature for placement in a dish or cone as contrasted to a solid frozen block from which the confection is difficult to separate and remove. Thus, the invention provides an aerated frozen confection which is easily scoopable after being taken from a home freezer by a consumer. In this regard, the aerated frozen confection includes at least one freezing point depressant. Suitable freezing point depressants include polyols such as sorbitol, mannitol, lactilol, xylitol, maltitol, glycerol, ethanol, and mixtures thereof. Preferably, the freezing point depressant is glycerol or ethanol. Other freezing point depressants include sucrose, dextrose, fructose, glucose syrup, polydextrose, preferably corn syrup of a dextrose equivalent (DE) >40, inulin or a mixture thereof. The freezing point depressant softens the frozen confection thereby making it sufficiently soft to scoop from a container or receptacle at a temperature of about −18° C. or less. Preferably, the freezing point depressant is present in an amount of about 0.5 to about 5% by weight of the aerated frozen confection. Thus, a soft, scoopable aerated frozen confection in which the freezing point has been reduced by the addition of freezing point depressants, and provides a scoopable ice cream having regulated ice crystal growth. Furthermore, as an added benefit of using a freezing point depressant is that an aerated frozen confection may be provided having less fat, which enables manufacture of a less expensive confection such as ice cream, or alternatively, manufacture of an ice cream which is more dietetic but which has the same softness and texture as a conventional high-fat ice cream.

In another aspect of the invention, the aerated frozen confection is a "light" aerated frozen confection. The term "light aerated frozen confection" as used herein is intended to mean a frozen confection having a reduced calorie value. Advantageously, the light frozen confection of the present invention has reduced crystal growth after being exposed to heat shock, but also is provided with a smooth, and creamy, texture, a feature often lacking from conventional low calorie frozen desserts. The light aerated frozen confection comprises a fat of vegetable or animal origin, preferably a fat that is rich in polyunsaturated fatty acid. Suitable oils may be non-hydrogenated vegetable fats such as those high in oleic oils, or those having blends containing long-chain polyunsaturated fatty acids such as gammalinolenic, docosahexaenoic, and eicospentaenoic acids. Thus, the fat may be obtained from sources such as seeds, sunflower, canola, safflower, rapeseed, soy, rice, borage, nuts including walnuts, almonds, macadamia, coconut, palm, palm kernal, apricot kernal, and other plants including olive, and peanut, or fish or microbial oils.

As mentioned above, although the light aerated frozen confection has a reduced calorie value, the organoleptic qualities of the frozen confection is not sacrificed. Thus, the light aerated confection offers a frozen confection with nutritional attributes. As shown in Table XV, the characteristics of smoothness and creaminess are increased and in particular better preserved during the period of storage due to the reduced crystal growth exhibited by the confections of the invention. Thus, the light aerated frozen confection of the present invention has a superior taste and quality over other traditional light frozen confections.

In yet another aspect of the invention, it has also been found that an aerated frozen product mix can be finely aerated in a freezer to a desired overrun by using an emulsifier blend for bulk ice cream, bulk water ice, bulk yogurt, individual ice cream portions, cones, bars, etc. The emulsifier blend preferably contains a mixture of propylene glycol monostearate, sorbitan tristearate, and unsaturated monoglycerides. This procedure eliminates the whipping step of the prior art which either conducts a whipping step prior to freezing followed by molding, or partially freezes a mixture, followed by molding. Neither process of the prior art provides a frozen ice cream, ice milk, yogurt, or water ice product that has a fine and stable aerated structure.

The emulsifier blend of the present invention facilitates and stabilizes fat α-crystals. Typically, in conventionally prepared frozen products, fat is present in a β-crystal structure. The fat β-crystal is an energetically lower crystal structure and thus, a preferred configuration for fat crystals. The emulsifier blend of the present invention, however, facilitates the formation and stabilization of the higher energy configuration fat α-crystals in the frozen aerated products.

The presence of fat α-crystals in the aerated frozen products has several advantages. The fat α-crystal configuration supports and stabilizes a fat film or structure surrounding the air cells which prevents small air cells from agglomerating into larger air cells. Also, the surface areas of the fat α-crystals serve as barriers that do not allow ice crystals, within the aerated frozen products, to grow into larger ice crystals. The formation of small air cells and their stabilization through fat α-crystals substantially restricts the growth of ice crystals and this in turn, creates an aerated frozen product with a smoother, creamier texture and which is heat shock resistant.

Furthermore, the process of the present invention yields an ice cream product with an unconventionally high overrun of about 20% to about 250% and an unconventionally high overrun for water ice products of about 5% to about 100%. Moreover, the aerated frozen products have a significantly higher resistance to shrinkage and heat shock, have a smoother uniform air pocket free appearance, and a creamier and more desirable eating quality compared to conventionally prepared products.

The term "aerated frozen products," as used herein, unless otherwise indicated, means ice cream, water ice, yogurt, frozen yogurt, sherbert, fruit ice, low fat ice cream, ice milk, etc. The mixture suitable for an aerated frozen product may be any conventional mix such as an ice cream mix, a frozen yogurt mix, a water ice mix, a fruit juice mix, a sherbet mix, or a combination thereof with the emulsifier blend used in the present invention. An ice cream mix may contain fat, non-fat milk solids, carbohydrates, or stabilizers together with water and, if desired, other conventional ingredients such as mineral salts, colorants, flavorings, inclusions, etc. A water ice mix comprises fruit juices, sugar, stabilizer, and small amounts of milkfat and non-fat milk solids.

Also in accordance with the invention is a method for regulating crystal growth in an aerated frozen confection. The method comprises adding to a mixture of ingredients for forming an aerated frozen confection a polyol ester of a fatty acid in an amount sufficient to regulate crystal growth when the aerated frozen confection is subjected to heat shock.

In one embodiment of the method, the preparation of aerated frozen product of the invention can be carried out using conventional equipment. The first step comprises mixing the ingredients and the polyol ester of fatty acid under shear mixing to disperse and/or solubilize the ingredients into a homogeneous mass. One of ordinary skill in the art with little or no experimentation can determine mixing time and conditions to obtain the desired homogeneous mass. Thereafter, the homogeneous mass is preheated, e.g., to a temperature of about 62° C. to about 75° C. The preheated homogeneous mass is conventionally homogenized, e.g., in a two stage homogenizer. The first stage is conducted at a pressure of about 70 bar to about 250 bar, preferably of about 100 bar to about 150 bar, more preferably about 150 bar. The second stage is conducted at a pressure of about 0 bar to about 50 bar, preferably of about 20 bar to about 35 bar. Subsequently, pasteurization of the homogenized mass is conducted under conditions commonly used in the industry.

The pasteurization step is conducted at a temperature of about 50° C. to about 100° C., preferably at about 60° C. to about 85° C. for a time of about 10 seconds to about 30 minutes, preferably for at least about 30 seconds followed by cooling to a temperature of about 0° C. to about 10° C., and preferably at about 4° C. Preferably, pasteurization is conducted by either high temperature short time (HTST) or low temperature long time (LTLT) processing.

After pasteurization, the mix is preferably aged by allowing to stand at a temperature of about 0° C. to about 6° C., preferably of about 1° C. to about 5° C. and for a time of about 1 hour to about 24 hours, preferably of about 2 hours to about 18 hours and more preferably of about 4 hours to about 12 hours. The mix is then colored and flavored as needed.

Subsequently, the mix is allowed to aerate in a conventional freezer for bulk, extruded, or cone products. If the mix is allowed to aerate in a conventional freezer, the draw temperature of the frozen aerated product should be sufficient to generate a viscosity and shear in the freezer barrel to create fine air cells of average mean diameter of 50 microns or less after hardening of the aerated frozen product. Typically, drawing temperatures include about −4° C. to about −10° C., preferably of about −5° C. to about −8° C.

If the mix is whipped using a conventional freezer, any freezer commonly used in the industry can be used to whip the mixture, e.g. Hoyer, CBW, PMS, etc. The mix is normally pumped into the freezer at a temperature of about 0° C. to about 8° C., preferably of about 2° C. to about 4° C. and substantially simultaneously an appropriate amount of air is introduced into the mix. Depending upon overrun desired in the final product a skilled artisan can easily determine the amount of air required. The step of freezing under agitation is conducted depending upon the freezing point of the mix. Typically, the step is conducted at a temperature of about −4° C. to about −8° C., preferably of about −5° C. to about −6° C. The time required is dependent on the amount of mix and air, and the pumping flow rate. An artisan can easily determine this without undue experimentation.

Subsequently, the aerated frozen product is packaged into bulk containers, extruded for bars or cones, or packaged into small containers. Bulk containers include container sizes of 3 gallons to 0.5 L, and small containers include container sizes of 250 ml to 50 ml.

The overrun for ice cream products aerated using a conventional freezer is in the range of about 20% to about 250%, preferably of about 40% to about 175%, more preferably of about 80% to about 150%. The overrun for molded ice cream products aerated using a whipper is in the range of about 40% to about 200%, preferably of about 80% to about 150%. The overrun for aerated water ice is in the range of about 5% to about 100%, preferably of about 20% to about 60%.

The aerated mix is then fed, preferably directly, to a container, e.g., by pumping through a filler, and then allowed to harden. Hardening may be allowed to take place either by using blast freezers or nitrogen tunnel at a temperature of about −30° C. to about −60° C. or quiescently at a temperature of about −25° C. to about −45° C., preferably of about −30° C. to about −40° C., or by other conventionally acceptable methods.

The aerated frozen products may afterwards be stored at a freezing temperature, usually at a temperature in the range of about −25° C. to about −35° C., preferably of about—28° C. to about −32° C., and more preferably at about −30° C. If desired, the product can be repackaged before shipping. Also for individual sized portions the aerated frozen products may be coated, for instance with chocolate or a compound coating. Compound coatings include coatings which do not contain 100% cocoa fat and coatings that contain any vegetable oil, such as canola oil, corn oil, soy oil, coconut oil, etc., or mixtures thereof. These coatings may also contain inclusions such as nut pieces, fruit pieces, rice crisps, or other additives therein. Furthermore, the aerated frozen product may be placed between cookies, or other edible substrates to form ice cream sandwiches or the like. The final aerated frozen products are then packaged and stored at a freezing temperature.

The aerated frozen products may include a shell rather than a coating. The shell material may include fruit juice, fruit ice, real fruit, water ice, or mixtures thereof. The shell may also have an overrun of up to about 20%.

The aerated frozen product produced by the process of the present invention has a creamier and warm eating quality, and a smooth, uniform, homogeneous texture and appearance, with small air cells of an average size of less than about 50 microns uniformly distributed substantially none of which are visible to the naked eye. Preferably, the small air cells have an average size of about 15 microns to about 40 microns, and more preferably of about 20 microns to about 35 microns. The aerated frozen products have an average ice crystal size less than ice crystals in conventionally prepared ice cream or water ice before and after heat shock, improved heat shock resistance and improved shrinkage resistance.

The aerated frozen products of the present invention have an average air cell size of less than 50 microns and ice crystal size of about 25 microns. The frozen aerated products of the present invention, after heat shock subsequent to production, have an average air cell size similar to the untreated product, an average ice crystal size below about 30 microns, and an apparent change in product volume of less than about 5% by volume. Also, the frozen aerated products can maintain a smoother and creamier texture and mouth feel, do not suffer from shrinkage, and do not give a cold feeling in the mouth.

To summarize, the aerated frozen products produced by the process of the present invention exhibit reduced and regulated crystal growth after heat shock, thereby having a texture which is smoother, creamier and having a warmer mouth feel than a conventionally ice cream or water ice even at lower overruns. The present invention also provides an aerated frozen ice cream having an overrun of about 20% to about 250% and a water ice having an overrun of about 5% to about 100% with small air cells uniformly distributed and substantially none of which are visible to the naked eye.

Figure 2:
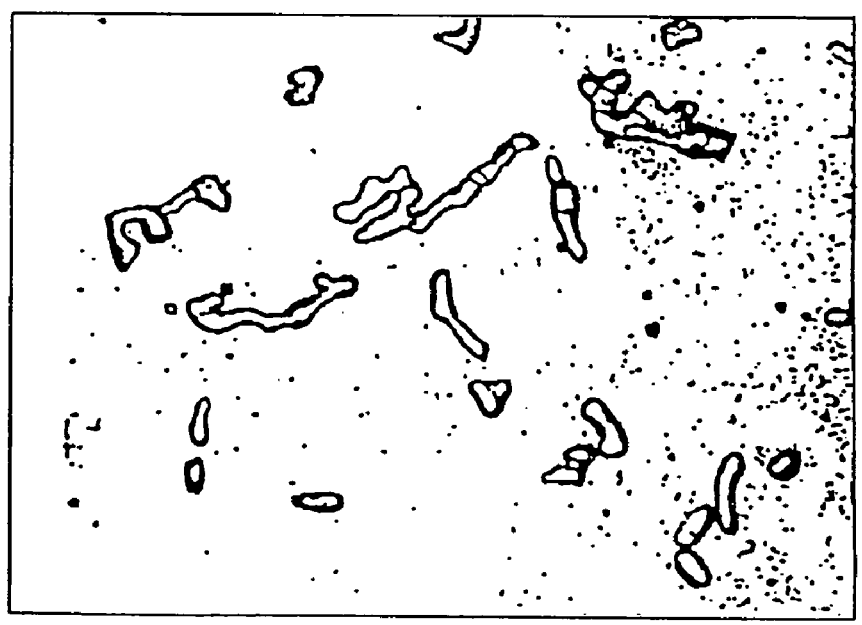
FIG. 2 illustrates ice crystals in a molded aerated ice cream bar, made by a process for producing frozen aerated ice cream, after heat shock.

FIG. 1 illustrates the ice crystals of a conventionally prepared molded aerated ice cream bar after heat shock, taken with a microscope at −20° C. The ice crystals are substantially larger and straighter in shape. FIG. 2 illustrates the ice crystals of aerated frozen ice cream prepared as taught by the present invention taken with a microscope at −20° C. FIG. 2 shows that the ice crystals in products produced according to the present invention are thinner than ice crystals of conventionally prepared frozen bars and of a substantially curved rod like shape.

Figure 3:
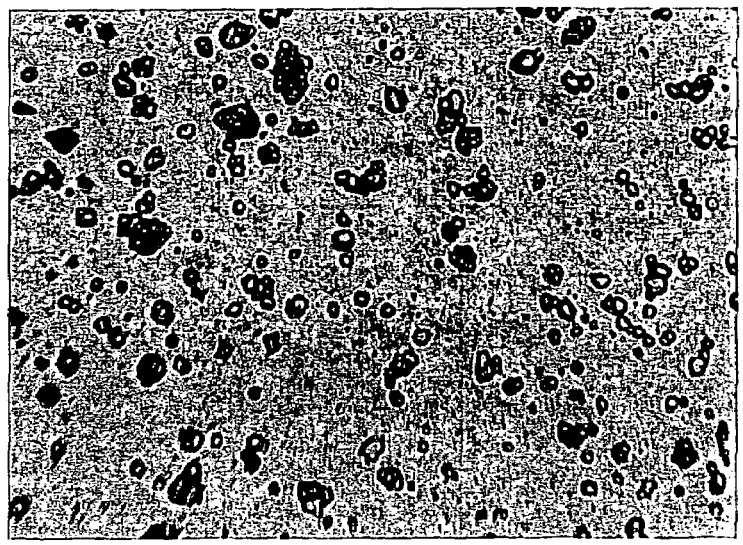
FIG. 3 illustrates ice crystals of conventionally prepared ice cream samples (standard) and ice cream samples of the present invention (test).
Figure 3:
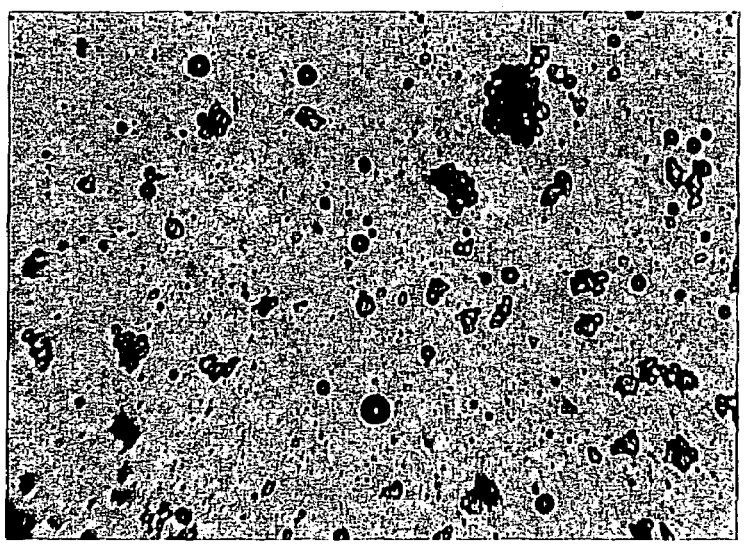

FIG. 3 illustrates the ice crystals of a conventionally prepared ice cream sample (standard) as compared to an ice cream sample made using the present invention. The standard ice cream sample clearly contains ice crystals of larger size than the ice crystals of the ice cream sample using the present invention. Additionally, FIG. 4 demonstrates that the standard ice cream sample after heat shock treatment contains larger ice crystals in comparison to the test sample prepared using the present invention.

Figure 4:
FIG. 4 illustrates ice crystals of heat shocked conventionally prepared samples (standard) and samples of the present invention (test).
Figure 4:
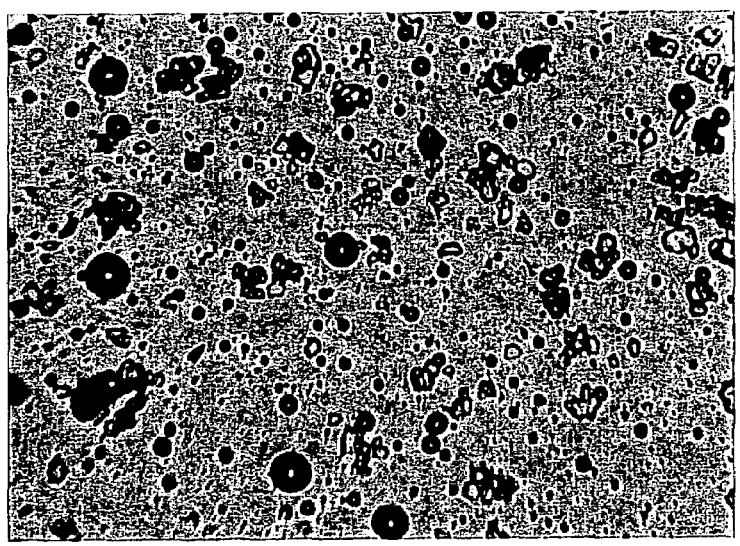
Figure 5:
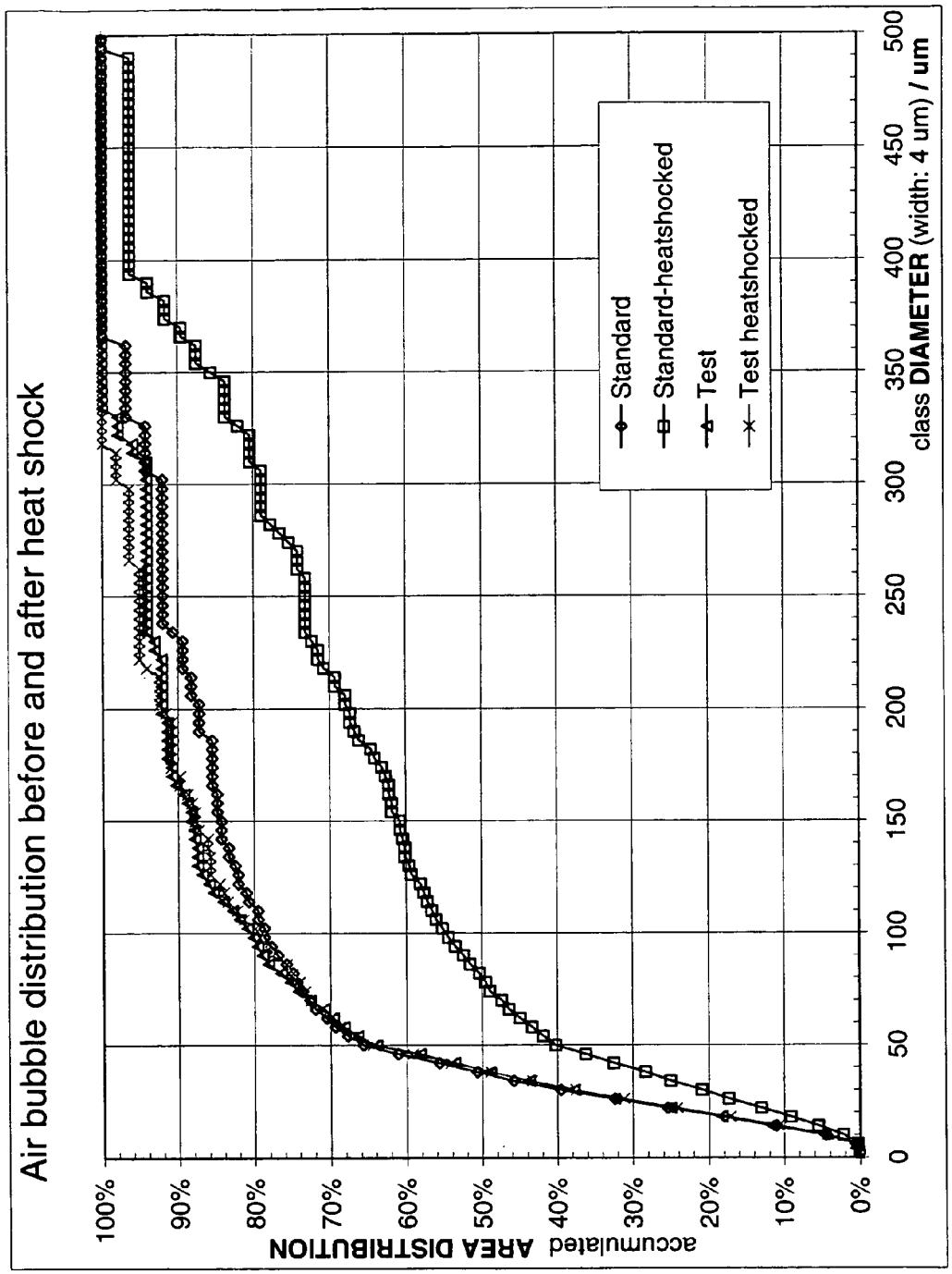
FIG. 5 illustrates a comparison of air bubble distribution of conventionally prepared standard samples and samples prepared using the present invention before and after heat shock treatment.

The relationship shown in FIGS. 3 and 4 is graphically represented in FIG. 5 where air bubble distribution for both standard and test samples (samples prepared by the present process) is tabulated. The standard sample air cell size, represented by the accumulated area distribution, drastically increases after heat shock treatment, thus indicating severe air cell size growth. In contrast, the test sample accumulated area distribution is unaffected by heat shock treatment. Consequently, after heat shock treatment, the average ice crystal size in the test sample remains constant while conventionally prepared ice cream undergoes significant ice crystal growth.

For measuring ice crystal, an aliquot of ice confection is mixed with an equivalent quantity of glycerol and observed under a microscope at a temperature of −10° C. The measurement may be carried out in a chamber at −10° C. equipped with microscope and a camera. It is thus possible to measure the number average diameter $Mn_{(1,0)}$ (mean diameter) of the crystals (in μm) in the finished products and in the products which have been subjected to a heat shock (microscope magnification 129).

EXAMPLES

The following Examples and accompanying drawings further illustrate the present invention and are not intended to limit the spirit of the invention.

Example 1

An ice cream mix was prepared from 8% (by weight) partially hydrogenated palm kernel oil, 11% nonfat milk solids, 12% sucrose, 6% corn syrup solids (36DE) and 0.5% of a stabilizer blend containing combinations of hydrocolloids such as guar, locust bean gum, carrageenan, carboxymethyl cellulose, etc. together with emulsifiers. The ingredients were mixed with agitation to disperse and solubilize them into a homogeneous mass, homogenized with a two stage homogenizer at 2000 psig pressure at the first stage and 500 psig pressure at the second stage, followed by HTST pasteurization.

After pasteurization, the mix was aged by refrigerated storage at a temperature of 4° C. for 6 hours. The aged mix was colored, flavored, and then aerated in an Oakes Mixer at a temperature of 4° C. to an overrun of 130%.

The aerated mix was pumped to a mold and allowed to freeze to give the frozen molded bar. The freezing was allowed to take place quiescently at a temperature of −40° C. using cold brine. The frozen molded bar was demolded and subsequently coated with chocolate crunch bar at 35° C., packaged, and stored at −30° C.

The frozen molded bar produced by the process of the present invention had a creamier and warm eating quality of an extruded product, a smooth, uniform, homogeneous texture and appearance, with small air cells of an average size of less than 50 microns uniformly distributed substantially none of which were visible to the naked eye. The molded aerated frozen bar had a quick melt with substantially no lingering of product in the mouth. Ice crystals in the molded aerated frozen bar had a unique thin and substantially curved rod like shape and an average size of less than ice crystals in a conventionally molded aerated ice cream bar after heat shock, and had improved heat shock and shrinkage resistance.

Example 2

A water ice mix was prepared from 23% (by weight) sucrose, 7% corn syrup solids (36 DE) and 0.6% stabilizer blend containing combinations of hydrocolloids, such as guar, locust bean gum, pectin, carboxymethyl cellulose, gelatin, microcrystalline cellulose, hydrolyzed soy or milk proteins, etc. with or without emulsifiers. The ingredients were mixed with agitation to disperse and solubilize them into a homogeneous mass in water, homogenized with a two stage homogenizer at 1500 psig pressure at the first stage and 500 psig pressure at the second stage, followed by HTST pasteurization.

After pasteurization, the mix was aged by refrigerated storage at a temperature of 4° C. for 6 hours. The aged mix was colored, flavored, acidified (e.g. adding citric acid solution), and then aerated in an Oakes Mixer at a temperature of 4° C. to an overrun of 100%.

The aerated mix was then pumped to a mold and then allowed to freeze to give the frozen molded bar. The freezing was allowed to take place quiescently at a temperature of −40° C. using cold brine. The frozen molded bar was demolded, and then packaged and stored at −30° C.

The frozen molded bar produced by the process of the present invention had the creamier and warm eating quality of an extruded product, a smooth, uniform, homogeneous texture and appearance, with air cells substantially none of which were visible to the naked eye. The molded aerated frozen bar had a quick melt with substantially no lingering of product in the mouth.

Example 3

An ice cream was prepared using the ingredients described in Table I using a conventional freezer. The ice cream product had an overrun of 120%. The draw temperature at the freezer outlet was constant at −6° C. After whipping the ice cream in a freezer, the product was placed into containers, conventionally hardened, and stored at −30° C.

TABLE I

| Ingredients | Percent Composition | |
|---|---|---|
| | Conventional | New |
| Fat | 10 | 10 |
| Non-fat milk solids | 7.5 | 7.5 |
| Whey solids | 2.5 | 2.5 |
| Sugar | 12.5 | 12.5 |
| Corn syrup solids, 36 DE | 4.5 | 4.5 |
| Guar | 0.15 | 0.15 |
| CMC | 0.05 | 0.05 |
| Carrageenan | 0.02 | 0.02 |
| Mono-diglycerides or monoglycerides | 0.30 | — |
| Propylene glycol monostearate | — | 0.3 |
| Sorbitan tristearate | — | 0.03 |
| Unsaturated monoglycerides | — | 0.05 |
| Water | 62.5 | 62.4 |
| Total solids | 37.5 | 37.6 |

To compare heat shock resistance, ice cream products made according to the present invention and using conventional methods were tested. Both types of ice cream products were treated to heat shock, as described above, or alternatively for 6 days at −8° C. Ice crystals, air bubble size and sensory attributes of the products were evaluated before and after the products were heat shock treated. Generally, the ice cream products using the present emulsifier system remained smoother and comparable to fresh standard products. (Table II and FIGS. 3 and 4). Additionally, the ice crystals and air bubble growth of the products according to the present invention were highly restricted during heat shock as compared to conventionally made ice cream products. (FIG. 5).

TABLE II

| | Method of Sample Preparation | |
|---|---|---|
| Treatment | Conventional | Present invention |
| Fresh/Not treated | 6.6 | 8.1 |
| Heat Shocked | 4.7 | 8.3 |

* Measured by a trained sensory panel using a smoothness scale of 0 to 10. 0 being the least and 10 being the most smooth product.

Examples 4, 5 and Comparative Examples 4, 5 with Reference to Example 3

Examples of aerated frozen confections according to the present invention and comparative examples are produced according to the formulations indicated in Table III represented below.

TABLE III

| Ingredients | Ex. 4 | Comparative Example 4 | Ex. 5 | Comparative Example 5 | Example 3 |
|---|---|---|---|---|---|
| Sweet whey powder (SWP) | 10 | 0 | 8 | 0 | 2.5 |
| Skim milk powder (MSK) | 0 | 10 | 2 | 10 | 7.5 |
| PGMS | 0.3 | 0 | 0.3 | 0 | 0.3 |
| UMG | 0.08 | 0 | 0.08 | 0 | 0.05 |
| SMDG | 0 | 0.3 | 0 | 0.3 | 0 |
| Sorbitan tristearate | 0 | 0 | 0 | 0 | 0.03 |
| Guar Gum | 0.25 | 0.25 | 0.067 | 0.067 | 0.15 |
| Kappa carrageenan | 0 | 0 | 0.013 | 0.013 | 0.02 |
| Sodium alginate | 0 | 0 | 0.067 | 0.067 | 0 |
| Carboxymethyl cellulose | 0 | 0 | 0 | 0 | 0.05 |
| Vegetable lauric fat blend | 9 | 9 | 9 | 9 | 10 |
| Sucrose | 14 | 14 | 14 | 14 | 12.5 |
| Glucose syrup DE 38-42 | 3 | 3 | 3.2 | 3.1 | 4.5 |
| Water | 63.37 | 63.45 | 63.35 | 63.37 | 62.4 |

Sweet whey powder: whey proteins, non-demineralized from Euroserum, 10 to 12% protein;
Fat: Blend of refined coconut and refined deodorized palm oil;
PGMS: Propylene glycol monostearate PGMS SPV ® from Danisco;
UMG: Unsaturated monoglyceride DIMODAN UP/B ® from Danisco;
SMDG: Saturated Mono-diglycerides: ADMUL ® 60-04 from Quest.

The ingredients for each example in Table III above were dispersed at 65° C. and then underwent a hydration step at 60° C. for 20 minutes. The mixture was then homogenized at 180 bar with the aid of a homogenizer and then was pasteurized at 86° C. for 20 s. After cooling to 5° C., the mixture was aged for 24 hours at 4° C., without stirring. Finally, the mixture was frozen at about −5.1 to −5.7° C. draw temperature with a degree of overrun of 97 to 102%. The frozen confection obtained was hardened at −30° C. by conventional means.

The size of the crystals and the ice crystal growth was then compared. The results are shown in Table IV below.

TABLE IV

|  | Mean diameter of the ice crystals (μm) | | Growth after heat shock | |
| --- | --- | --- | --- | --- |
|  | Storage at −30° C. | After heat shock | μm | % |
| Example 4 | 20 | 25 | 5 | 25 |
| Comp. Example 4 | 31 | 50.5 | 20.5 | 66 |
| Example 5 | 19 | 22.5 | 3.5 | 18 |
| Comp. Example 5 | 32 | 51 | 19 | 59.5 |
| Example 3 | 21 | 26.5 | 5.5 | 26 |

As shown in Table IV above, the mean diameter of the ice crystals in various frozen products comprising propylene glycol monoester of fatty acid and UMG and predominantly sweet whey as non-fat milk solids, on the one hand, is smaller than the mean diameter of the ice crystals of the comparative examples after heat shock. Thus, the examples 4 and 5 in accordance with the invention exhibit a significantly smaller increase in crystal size than that of conventional products (comparative examples 4 and 5) and for the product of Example 3.

Analysis of the size and of the distribution of the ice crystals shows that that the partial or total replacement of non-fat milk solids from skim milk with non-fat milk solids from whey improves the stability of the samples subjected to heat shock when propylene glycol monoester of fatty acid is used.

Moreover, a sensory analysis of Examples 4 and 5 of the invention compared to the conventional ice creams of Comparative Example 4 and Comparative Example 5 by a panel of persons trained in evaluating texture disclosed that the smoothness of texture of the Examples of the invention was significantly higher than those of the conventional ice cream products of Comparative Examples 4 and 5. A questionnaire, which contained descriptive attributes for texture in the mouth, was distributed to each of the panelists. The descriptive attributes included smoothness, absence of particles, ice crystals in the ice cream mass; chewyness, resistance to bite and mouth coating, amount and persistence of the fatty film coating the mouth and palate.

The results of the analysis was that the smoothness of the products of Ex. 4 and Ex. 5 was significantly higher than the comparative examples. Some differences on other attributes were also observed, in particular Ex. 4 and Ex. 5 showed increased chewyness and mouth coating.

Examples 6, 7, 8 and 9

Frozen confections were manufactured having different fat levels. The fat used in these examples was a mixture of palm oil and coconut oil is used. The formulations are indicated in Table V below. The size and crystal growth after heat shock are indicated in Table VI below.

TABLE V

Formulations for Examples 6, 7, 8 and 9

| Ingredient | Ex. 6 | Ex. 7 | Ex. 8 | Ex. 9 |
| --- | --- | --- | --- | --- |
| Fat | 3.6 | 5.4 | 7.2 | 10.2 |
| Sweet whey powder | 10 | 10 | 10 | 10 |
| PGMS | 0.3 | 0.3 | 0.3 | 0.3 |
| UMG | 0.08 | 0.08 | 0.08 | 0.08 |
| Guar | 0.25 | 0.25 | 0.25 | 0.25 |
| Sucrose | 14 | 14 | 14 | 14 |
| Glucose syrup DE 38-42 | 3 | 3 | 3 | 3 |
| Total solids adjusted to 36 with glucose syrup DE 20-22 | 36 | 36 | 36 | 36 |

TABLE VI

Size of the crystals and ice crystal growth of Examples 6, 7, 8 and 9

|  | Mean diameter of the ice crystals (μm) | | Growth after heat shock | |
| --- | --- | --- | --- | --- |
| Example | Storage at −30° C. | After heat shock | μm | % |
| 6 | 18.5 | 19 | 0.5 | 2.7 |
| 7 | 19 | 19.5 | 0.5 | 2.6 |
| 8 | 21 | 26.5 | 5.5 | 26 |
| 9 | 21 | 23.5 | 2.5 | 11.9 |

As shown in Table VI above the reduction of ice crystal growth after heat shock is substantially independent on the level of fat in the product.

Example 10

As shown in Example 10 and Table VIII below the emulsifier PGMS regulates and reduces ice crystal growth after heat shock in an aerated frozen confection even when used as a sole emulsifier. The example compares an aerated frozen confection formulation comprising the emulsifier PGMS alone, and together with UMG or SMDG in connection with non-fat milk solids. The formulations for the frozen confections compositions are provided in Table VIII below. The results of the comparison are illustrated in Table IX below.

TABLE VII

| Ingredients | Admul 60.04 | PGMS | PGMS/ Admul 60.04 | PGMS/ Dimodan UP | Admul 60.04/ Dimodan UP |
| --- | --- | --- | --- | --- | --- |
| Fat | 9.00 | 9.00 | 9.00 | 9.00 | 9.00 |
| Milk solids-not-fat (SWP 80/MSK 20) | 10.00 | 10.00 | 10.00 | 10.00 | 10.00 |
| PGMS | 0 | 0.38 | 0.38 | 0.30 | 0 |
| SMDG | 0.38 | 0 | 0.08 | 0 | 0.30 |
| UMG | 0 | 0 | 0 | 0.08 | 0.08 |
| Stabilizer blend | 0.22 | 0.22 | 0.22 | 0.22 | 0.22 |
| Sugar | 14.00 | 14.00 | 14.00 | 14.00 | 14.00 |
| Glucose syrup DE 40 | 3.00 | 3.00 | 3.00 | 3.00 | 3.00 |
| Water to | 100% | 100% | 100% | 100% | 100% |

TABLE VIII

| | Mean diameter of the ice crystals (μm) After heat shock |
|---|---|
| Admul 60.04 | 48.5 |
| PGMS | 20.0 |
| PGMS + Admul 60.04 | 20.5 |
| PGMS + Dimodan UP | 19.5 |
| Admul 60.04 + Dimodan UP | 48.0 |

As shown in Tables VIII, and IX above, while the formulations comprising conventional mono-diglycerides exhibit a crystal size after heat shock treatment of about 50 μm, the examples comprising PGMS exhibit an ice crystal size that is significantly smaller and about 20 μm. Thus, the use of PGMS regulates ice crystal growth in aerated frozen confections.

The heat shock samples were also evaluated by a panel of persons which score the Examples with smoothness attributes ranging in a scale from 0 to 100. The results are given in Table X below.

TABLE X

| | Attribute Smoothness |
|---|---|
| Admul 60.04 | 24.2 |
| PGMS | 70.8 |
| PGMS + Admul 60.04 | 70.0 |
| PGMS + Dimodan UP | 69.2 |
| Admul 60.04 + Dimodan UP | 35.0 |

The results shown in Table X illustrate that Examples that comprise PGMS have a texture that is significantly smoother than those containing only mono-diglycerides. Thus, the use of PGMS not only regulates the ice crystal growth in an aerated frozen confection but also provides a confection having superior smoothness and texture.

The frozen confections exhibit improved stability and organoleptic characteristics compared to traditional products. These products exhibit remarkable reduced ice crystal growth compared with traditional products when submitted to heat shock treatment. This property confers to the product smooth texture, which is considerably preserved after unfavorable storage conditions. Such functionalities make it possible to envisage production, storage and distribution of the products according to the invention extending over time.

The expression "reduced crystal growth" is understood to mean an increase in the mean diameter of the ice crystals of less than 50% after heat shock.

Example 11

The objective of Example 11 is to produce a soft, scoopable, aerated frozen confection comprising a freezing point depressant sugar and comparing the texture and sensory attributes of the soft, scoopable aerated frozen confection to a conventional product made with conventional ingredients. It was surprisingly found that the use of polyol esters of fatty acids preferably propylene glycol monostearate alone or in combination with other food-grade emulsifiers, such as unsaturated monoglyceride, produced aerated frozen products having outstanding texture properties and having superior heat shock stability. An example of frozen confections made according to the present invention and comparative example are produced according to the formulations indicated in Table XI below.

TABLE XI

| Ingredient | Ex 11 | Comp Ex. 11 |
|---|---|---|
| Vegetable lauric fat blend | 9 | 9 |
| Sweet whey powder (SWP) | 10 | 10 |
| PGMS | 0.3 | 0 |
| UMG | 0.08 | 0.08 |
| SMDG | 0 | 0.3 |
| Stabilizers | 0.2 | 0.25 |
| Sucrose | 1 | 14 |
| Glucose syrup | 6.5 | 3 |
| Dextrose | 11 | 0 |
| Water | 61.92 | 63.37 |
| Total solids % | 36.0 | 36.4 |
| Calculated freezing point (° C.) | −3.01 | −2.3 |

Vegetable lauric fat blend: Blend of palm and palm kernel oil;
Sweet whey powder: whey proteins, non-demineralized from Euroserum, 10 to 12% protein;
Skim milk powder from BBA;
PGMS: Propylene glycol monostearate PGMS SPV ® from Danisco;
UMG: Unsaturated monoglyceride DIMODAN UP/B ® from Danisco;
SMDG: Saturated Mono-diglycerides: CREMODAN 60 Veg ® from Danisco;
Stabilizers: Guar gum (Procol G2 from Habgen) or Sodium alginate (Manucol DM from ISP Alginates);
Glucose syrup: Glucose MD 40 from Roquette.

The freezing point achieved in this example is an average value. In order to keep a very soft product at a serving temperature below −18° C. it may be necessary to decrease the freezing point to −4.5° C. e.g. by addition of 2.5% of ethanol (at 98 volume) or 4% glycerol, based on the total composition of the formulation.

Table XII below describes the measured mean ice crystal size of both formulations of Example 11 and Comparative Example 11 after heat shock. The Example 11 which comprises a blend of PGMS and UMG exhibited smaller ice crystals and crystals that were significantly more resistant to growth following heat shock treatment compared to the comparative example 11.

TABLE XII

| Example | Ice crystal size (μm) After heat shock |
|---|---|
| Example 11 | 30 |
| Comp. ex. 11 | 54.5 |

The heat shock examples were also evaluated for the texture attribute of smoothness by a trained testing panel. The texture of the product of example 11 had a very high smoothness and the aspect was good. Thus, it was once again found that the use of polyol esters of fatty acids, preferably PGMS alone or in combination with other food grade emulsifiers, such as unsaturated mono glyceride, reduced the ice crystal growth in aerated frozen products and maintained the same smoothness and heat shock stability of a standard version.

Example 12

The objective of example 12 was to produce a light aerated frozen confections made with liquid vegetable oil(s) and compare the texture and sensory attributes of the example to a comparable product made with conventional vegetable fats currently used in the aerated frozen dessert preparation.

It was surprisingly found that the use of polyol esters of fatty acid, preferably propylene glycol monostearate alone or in combination with other food-grade emulsifiers, such as mono-diglycerides, produces light aerated frozen products, which are rich in PUFA oil, and that also have outstanding texture properties and superior heat shock stability.

Examples of frozen confections made according to the present invention and comparative examples are produced according to the formulations indicated in Table XIII below.

TABLE XIII

| Ingredient | Ex. 12 | Comp Ex. 12.1 | Comp Ex. 12.2 |
|---|---|---|---|
| Vegetable lauric fat blend | 0 | 0 | 10.20 |
| PUFA-rich oil | 11.10 | 11.10 | 0 |
| Sweet whey powder (SWP) | 2.00 | 2.00 | 2.00 |
| Skim milk powder (MSK) | 8.00 | 8.00 | 8.00 |
| PGMS | 0.33 | 0 | 0 |
| UMG | 0.05 | 0 | 0 |
| SMDG | 0 | 0.30 | 0.30 |
| Guar Gum | 0.25 | 0.067 | 0.067 |
| Sucrose | 12 | 12 | 12 |
| Glucose syrup | 5.00 | 5.00 | 5.00 |
| Water | 61.32 | 61.40 | 62.30 |

Vegetable lauric fat blend: Blend of palm and palm kernel oil;
PUFA-rich oil blend: Blend of rapeseed oil and high-melting fat fractions;
Sweet whey powder: whey proteins, non-demineralized from Euroserum, 10 to 12% protein;
Skim milk powder from BBA;
PGMS: Propylene glycol monostearate PGMS SPV ® from Danisco;
UMG: Unsaturated monoglyceride DIMODAN UP/B ® from Danisco;
SMDG: Saturated Mono-diglycerides: CREMODAN 60 Veg ® from Danisco;
Guar gum: Procol G2 from Habgen;
Glucose syrup: Glucose MD 40 from Roquette.

The nutritional attribute achieved in example 12 relates to the use of "healthier" fats or oils, i.e. those containing high levels of unsaturated and no or low levels of trans-fatty acids. Some conventional fats used in the production of aerated frozen desserts have been linked to development of so-called "Western civilization diseases" such as heart disease, high blood pressure, diabetes and the like, due to the presence of high levels of saturated and trans-fatty acids. Table XIV below gives the fatty acid composition of the formulations shown in Table XIII, above.

TABLE XIV

| | g/100 g | | |
|---|---|---|---|
| | Example 12 | Comp. ex. 12.1 | Comp. ex. 12.2 |
| Saturated FA | 1.8 | 1.8 | 8.0 |
| MUFA | 6.4 | 6.3 | 2.1 |
| PUFA | 3.2 | 3.2 | 0.4 |

MUFA: Monounsaturated fatty acid.

Table XV below shows the mean diameter of the ice crystals for products described in Table VIII above. Example 12, which comprises a blend of PGMS and UMG, exhibits smaller ice crystals and the crystals are significantly more resistant to growth following heat shock treatment compared to the other comparative examples.

TABLE XV

| | Ice crystal size (μm) | |
|---|---|---|
| Sample | Before heat shock | After heat shock |
| Example 12 | 18 | 20 |
| Comp. ex. 12.1 | 28 | 48 |
| Comp. ex. 12.2 | 31 | 47 |

The examples were also evaluated by 10 trained panellists who scored each texture attribute in a scale from 0 to 100, with 100 being the score for highest smoothness. The results are given in Table XVI below. As shown, Example 12 which contains the blend of PGMS and UMG was found to be smoother than each of the other examples.

TABLE XVI

| | Attribute Smoothness |
|---|---|
| Example 12 | 74.0 |
| Comp. ex. 12.1 | 60.0 |
| Comp. ex. 12.2 | 46.7 |

Examples 13 and 14

The objective of these examples is to produce aerated frozen confections with reduced calorie values and having acceptable texture and sensory properties. It was surprisingly found that the use of polyol esters of fatty acids, preferably PGMS alone or in combination with other food grade emulsifiers, such as mono-diglycerides, produced aerated calorie-reduced frozen products with outstanding texture properties and with good heat shock stability. Examples of aerated frozen confections produced according to the formulations are indicated in Table XVII below.

TABLE XVII

| Ingredients | Example 13 | Example 14 | Comp. Ex. 14 |
|---|---|---|---|
| Vegetable fat blend (Palm oil, Coconut oil) | 0 | 0 | 9.00 |
| Sweet whey powder (SWP) | 10.00 | 10.00 | 10.00 |
| PGMS | 0.30 | 0.30 | 0 |
| UMG | 0.08 | 0.08 | 0.08 |
| SMDG | 0 | 0 | 0.30 |
| Guar Gum | 0.75 | 0.75 | 0.25 |
| Sucrose | 10.00 | 8.00 | 14.00 |
| Glucose syrup DE 40 | 10.00 | 10.00 | 3.00 |
| Glucose syrup DE 20 | 8.00 | 0 | 0 |
| Lactitol | 0 | 2.00 | 0 |
| Polydextrose | 0 | 4.00 | 0 |
| Inulin | 0 | 4.00 | 0 |
| Water | 60.87 | 60.87 | 63.37 |

In these examples the fat level was decreased to 0.3%, with the fat coming only from the emulsifiers. Some changes were made with texturizing agent such as stabilizers or carbohydrate based ingredients, and an adjustment of total solids to 38%. The total solids in comparative example 14 is 36%.

The ice crystal size of the examples submitted to heat shock was measured and the results are given in Table XVIII below.

TABLE XVIII

| | Examples | | |
|---|---|---|---|
| | 13 | 14 | Comp. ex. 14 |
| Mean Ice crystal size (μm) | 16.0 | 20.0 | 54.6 |

Despite the adjustment of stabilizers, it was expected that the products having a 0.3% fat content to exhibit a larger mean ice crystal size after heat shock. It is well known that the fat plays a key role in the stability of the ice cream and in particular on the ice crystal size. With the addition of PGMS in both formulations, it was possible to maintain a very small ice crystal size despite the low fat level. In addition, the texture of the products of example 13 and 14 were showing far superior smoothness and increased chewyness than the product of comparative example 16 with 9% fat.

The samples were also evaluated by a panel of persons trained in the evaluation of texture. To that end, samples of examples 13 and 14 made according to the invention were each compared with the standard ice cream of comparative example 14. A questionnaire was distributed among that panelists that contained the descriptive attributes for texture in the mouth including smoothness, absence of particles, ice crystals in the ice cream mass; chewyness, resistance to bite. The results in % are given in Table XIX below.

TABLE XIX

| Property | Example 13 | Example 14 | Comp. ex. 14 | Probability |
|---|---|---|---|---|
| Smoothness | 92.50 | 92.80 | 50.70 | <0.0001*** |
| Chewiness | 64.50 | 71.40 | 51.60 | 0.0022** |

**Significant to 1%
***Significant to 0.1%

It is clear that these examples demonstrate that it is possible to produce "light" version of aerated frozen products with reduced fat content and having acceptable texture and sensory properties. The use of polyol esters of fatty acids, preferably PGMS alone or in combination with other food grade emulsifiers, such as mono-diglycerides, enabled a reduction in the fat content in aerated frozen products while maintaining the same smoothness and heat shock stability of a standard "full-fat" version.

What is claimed is:

1. A method for enhancing heat shock resistance of an aerated frozen confection, the method comprising:
   preparing a mixture of ingredients for forming the aerated frozen confection, wherein the mixture of ingredients consists of a fat present in an amount of about 0.5% to 18% by weight of the mixture; a sweetener present in an amount of about 3% to 15% by weight of the mixture; a stabilizer in an amount of about 0.1% to about 1% by weight based on the total weight of the mixture; and non-fat milk solids present in an amount from about 6% to 15% by weight of the mixture;
   regulating the formation and growth of ice crystals by including in the mixture an ice crystal growth regulating agent consisting of a polyol monoester of a fatty acid in an amount sufficient to regulate ice crystal growth when the confection experiences heat shock; wherein the polyol monoester of a fatty acid is propylene glycol monostearate, propylene glycol palmitate or a combination thereof; and
   forming the aerated frozen confection from the mixture for consumption, wherein the aerated frozen confection has an average air cell size of less than 50 microns, an average ice crystal size of about 25 microns or less in mean diameter after ice crystal formation, and an average ice crystal size of 30 microns or less in mean diameter after the aerated frozen confection is subjected to heat shock to thus avoid an undesirable crystallized texture of the confection during consumption,
   wherein the stabilizer is selected from the group consisting of agar, gelatin, gum acacia, guar gum, locust bean gum, gum tragacanth, carrageenan and its salts, sodium alginate and propylene glycol alginate.

2. The method of claim 1, wherein the polyol monoester of a fatty acid is present in an amount of at least about 0.1% to about 1% of the mixture.

3. The method of claim 1, wherein sugar is present in an amount of no more than 14% by weight of the mixture and a sweetener other than a sugar that is present in an amount of about 3% to about 8% by weight of the mixture; and wherein the non-fat milk solids are present in an amount from about 8% to about boo by weight of the mixture.

4. The method of claim 3, wherein the non-fat milk solids are of whey origin.

5. The method of claim 1, wherein the method includes combining the polyol monoester of a fatty acid with the mixture of ingredients with shear mixing to form a homogeneous mass; pasteurizing the homogenous mass; and freezing the mass while introducing air to achieve a desired degree of overrun in the frozen mass.

6. The method of claim 5, wherein the degree of overrun in the frozen mass is between about 20% to 250%.

7. The method of claim 1, wherein the method produces an aerated frozen confection which can withstand a heat shock due to temperature recycling of from about −8° C. to about −20° C. every 12 hours for a period of about two weeks.

8. A method for enhancing heat shock resistance of an aerated frozen confection, the method comprising:
   preparing a mixture of ingredients for forming the aerated frozen confection, wherein the mixture of ingredients consists of a fat present in an amount of about 0.5% to 18% by weight of the mixture; a sweetener present in an amount of about 3% to 15% by weight of the mixture; a stabilizer in an amount of about 0.1% to about 1% by weight based on the total weight of the mixture; non-fat milk solids present in an amount from about 6% to 15% by weight of the mixture and a freezing point depressant such that the aerated frozen confection is scoopable at a temperature of about −18° C. or less;
   regulating the formation and growth of ice crystals by including in the mixture an ice crystal growth regulating agent consisting of a polyol monoester of a fatty acid in an amount sufficient to regulate ice crystal growth when the confection experiences heat shock, wherein the polyol monoester of a fatty acid is propylene glycol monostearate, propylene glycol palmitate, or a combination thereof; and
   forming the aerated frozen confection from the mixture for consumption, wherein the aerated frozen confection has an average air cell size of less than 50 microns, an average ice crystal size of about 25 microns or less in mean diameter after ice crystal formation, and an average ice crystal size of 30 microns or less in mean diameter after the aerated frozen confection is subjected to heat shock to thus avoid an undesirable crystallized texture of the confection during consumption,
   wherein the stabilizer is selected from the group consisting of agar, gelatin, gum acacia, guar gum, locust bean gum, gum tragacanth, carrageenan and its salts, sodium alginate and propylene glycol alginate.

9. The method of claim 8, wherein the freezing point depressant is selected from the group consisting of sucrose, dextrose, fructose, glucose syrup, polydextrose, inulin, sorbitol, mannitol, lactilol, oxylitol, maltitol, glycerol, ethanol or a mixture thereof.

10. The method of claim 1, wherein the aerated frozen confection has a reduced calorie value due to a lower level of fat compared to conventional aerated frozen confections, and further wherein the fat present in the mixture of ingredients comprises one or more polyunsaturated fatty acids.

11. The method of claim 1, wherein the frozen confection is an ice cream, a frozen water ice, frozen fruit juice, frozen yoghurt, sherbet, ice milk or a mixture thereof.

12. The method of claim 1, which further comprises providing the ice confection with one or more of inclusions, an edible substrate, a coating or a shell.

13. A method for enhancing heat shock resistance of an aerated frozen confection, the method consisting essentially of:
adding to a mixture of ingredients for forming the aerated frozen confection an ice crystal growth regulating agent consisting of a polyol monoester of a fatty acid in an amount sufficient to facilitate stabilization of ice crystal growth when the aerated frozen confection is subjected to heat shock wherein the polyol monoester of a fatty acid is propylene glycol monostearate, propylene glycol palmitate or a combination thereof, wherein the mixture of ingredients consists of a fat present in an amount of about 0.5% to 18% by weight of the mixture; a sweetener present in an amount of about 3% to 15% by weight of the mixture; a stabilizer in an amount of about 0.1% to about 1% by weight based on the total weight of the mixture; and non-fat milk solids present in an amount from about 6% to 15% by weight of the mixture;
combining the polyol monoester of a fatty acid and mixture of ingredients with shear mixing to form a homogeneous mass;
pasteurizing the homogenous mass; and
freezing the mass while introducing air to achieve degree of overrun of about 20% to about 250% to produce an aerated frozen confection for consumption, wherein the aerated frozen confection has an average air cell size of less than 50 microns, an average ice crystal size of about 25 microns or less in mean diameter after ice crystal formation, and resistance to heat shock as exhibited by an average ice crystal size of 30 microns or less in mean diameter after heat shock to thus avoid an undesirable crystallized texture of the confection during consumption,
wherein the stabilizer is selected from the group consisting of agar, gelatin, gum acacia, guar gum, locust bean gum, gum tragacanth, carrageenan and its salts, sodium alginate and propylene glycol alginate.

14. The method of claim 13, wherein the polyol monoester of a fatty acid is present in an amount of at least about 0.1 to 1% of the mixture.

15. The method of claim 13, wherein the aerated frozen confection is heat shock resistant and can withstand temperature recycling of about −8° C. to about −20° C. every 12 hours for a period of about two weeks.

16. The method of claim 1, wherein the non-fat milk solids are of whey origin, skim milk origin or mixtures thereof.

17. The method of claim 13, wherein the non-fat milk solids are of whey origin, skim milk origin or mixtures thereof.

18. The method of claim 1, wherein the non-fat milk solids are present in an amount of at least 7.5% by weight.

19. The method of claim 13, wherein the non-fat milk solids are present in an amount of at least 7.5% by weight.

20. The method of claim 13, wherein the aerated frozen confection has a reduced calorie value due to a lower level of fat compared to conventional aerated frozen confections, and further wherein the fat present in the mixture of ingredients comprises one or more polyunsaturated fatty acids.

21. The method of claim 13, wherein the frozen confection is an ice cream, a frozen water ice, frozen fruit juice, frozen yoghurt, sherbet, ice milk or a mixture thereof.

22. The method of claim 13, which further comprises providing the ice confection with one or more of inclusions, an edible substrate, a coating or a shell.

23. The method of claim 1, which further comprises packaging the aerated frozen confection into containers or extruding it into bars or cones after the forming step.

24. The method of claim 13, which further comprises packaging the aerated frozen confection into containers or extruding it into bars or cones after freezing.

25. A method for enhancing heat shock resistance of an aerated frozen confection, the method consisting essentially of:
adding to a mixture of ingredients for forming the aerated frozen confection an emulsifier as an ice crystal growth regulating agent, the emulsifier consisting of a polyol monoester of a fatty acid in an amount of at least about 0.1 to 1% of the mixture to facilitate stabilization of ice crystal growth when the aerated frozen confection is subjected to heat shock wherein the polyol monoester of a fatty acid is propylene glycol monostearate, propylene glycol palmitate or a combination thereof, wherein the mixture of ingredients consists of a fat present in an amount of about 0.5% to 18% by weight of the mixture; a sweetener present in an amount of about 3% to 15% by weight of the mixture; a stabilizer in an amount of about 0.1% to about 1% by weight based on the total weight of the mixture; and non-fat milk solids present in an amount from about 6% to 15% by weight of the mixture;
combining the emulsifier polyol monoester of a fatty acid and mixture of ingredients with shear mixing to form a homogeneous mass;
pasteurizing the homogenous mass; and
freezing the mass while introducing air to achieve degree of overrun of about 20% to about 250% to produce an aerated frozen confection for consumption, wherein the aerated frozen confection has an average air cell size of less than 50 microns, an average ice crystal size of about 25 microns or less in mean diameter after ice crystal formation, resistance to heat shock as exhibited by an average ice crystal size of 30 microns or less in mean diameter, and an apparent change in product volume of less than about the 5% by volume after heat shock to thus avoid an undesirable crystallized texture of the confection during consumption,
wherein the stabilizer is selected from the group consisting of agar, gelatin, gum acacia, guar gum, locust bean gum, gum tragacanth, carrageenan and its salts, sodium alginate and propylene glycol alginate.

26. The method of claim 25, wherein the aerated frozen confection has a reduced calorie value due to a lower level of fat compared to conventional aerated frozen confections, and further wherein the fat present in the mixture of ingredients comprises one or more polyunsaturated fatty acids.

27. The method of claim 25, wherein the frozen confection is an ice cream, a frozen water ice, frozen fruit juice, frozen yoghurt, sherbet, ice milk or a mixture thereof.

28. The method of claim 27, which further comprises providing the ice confection with one or more of inclusions, an edible substrate, a coating or a shell.

29. The method of claim 27, which further comprises packaging the aerated frozen confection into containers or extruding it into bars or cones after the forming step.

* * * * *

UNITED STATES PATENT AND TRADEMARK OFFICE
CERTIFICATE OF CORRECTION

PATENT NO. : 7,727,573 B2  Page 1 of 1
APPLICATION NO. : 11/029814
DATED : June 1, 2010
INVENTOR(S) : Vaghela et al.

It is certified that error appears in the above-identified patent and that said Letters Patent is hereby corrected as shown below:

Column 19:
Line 46 (claim 1, line 16), change "shock;" to -- shock, --.

Column 20:
Line 4 (claim 3, line 6), change "boo" to -- 10% --.
Line 67 (claim 11, line 3), change "yoghurt," to -- yogurt, --.

Column 21:
Line 64 (claim 21, line 3), change "yoghurt," to -- yogurt, --.

Column 22:
Line 56 (claim 27, line 3), change "yoghurt," to -- yogurt, --.

Signed and Sealed this

Sixth Day of July, 2010

David J. Kappos
*Director of the United States Patent and Trademark Office*